K. S. SATRE.
PARACHUTE.
APPLICATION FILED JAN. 2, 1918.

1,308,375.

Patented July 1, 1919.
3 SHEETS—SHEET 1.

WITNESSES
E. C. Wells
H. Opsahl.

INVENTOR
Knute S. Satre
BY HIS ATTORNEYS
Williamson Merchant

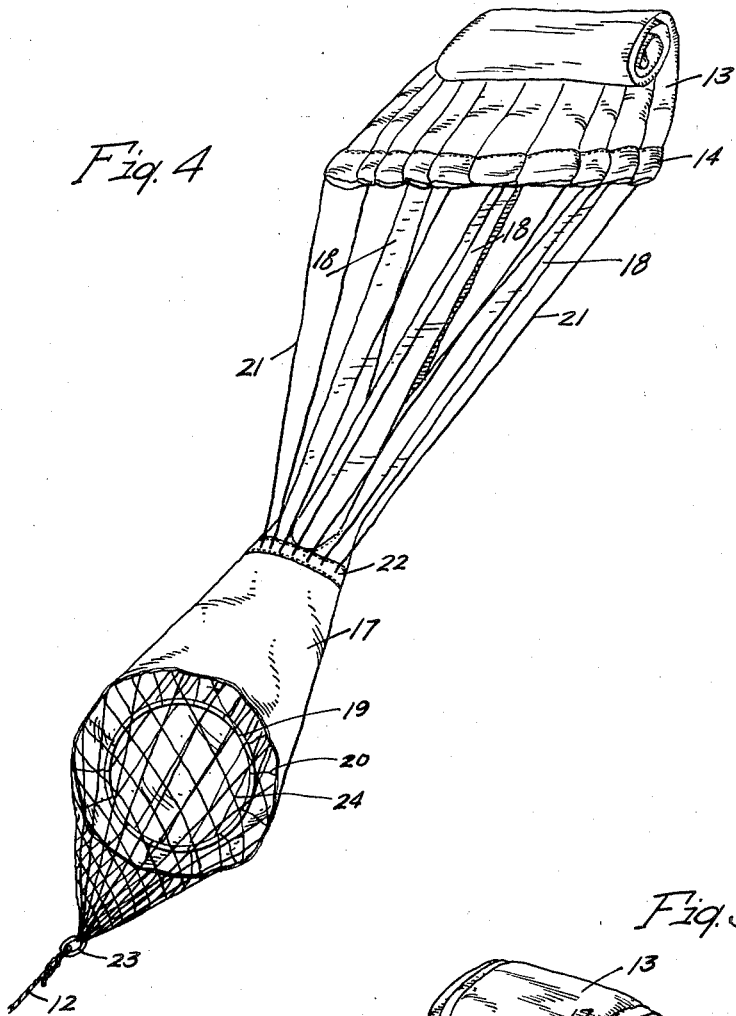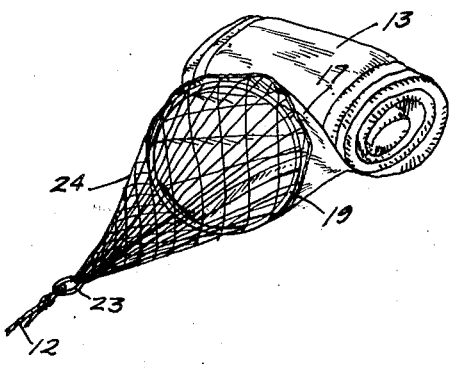

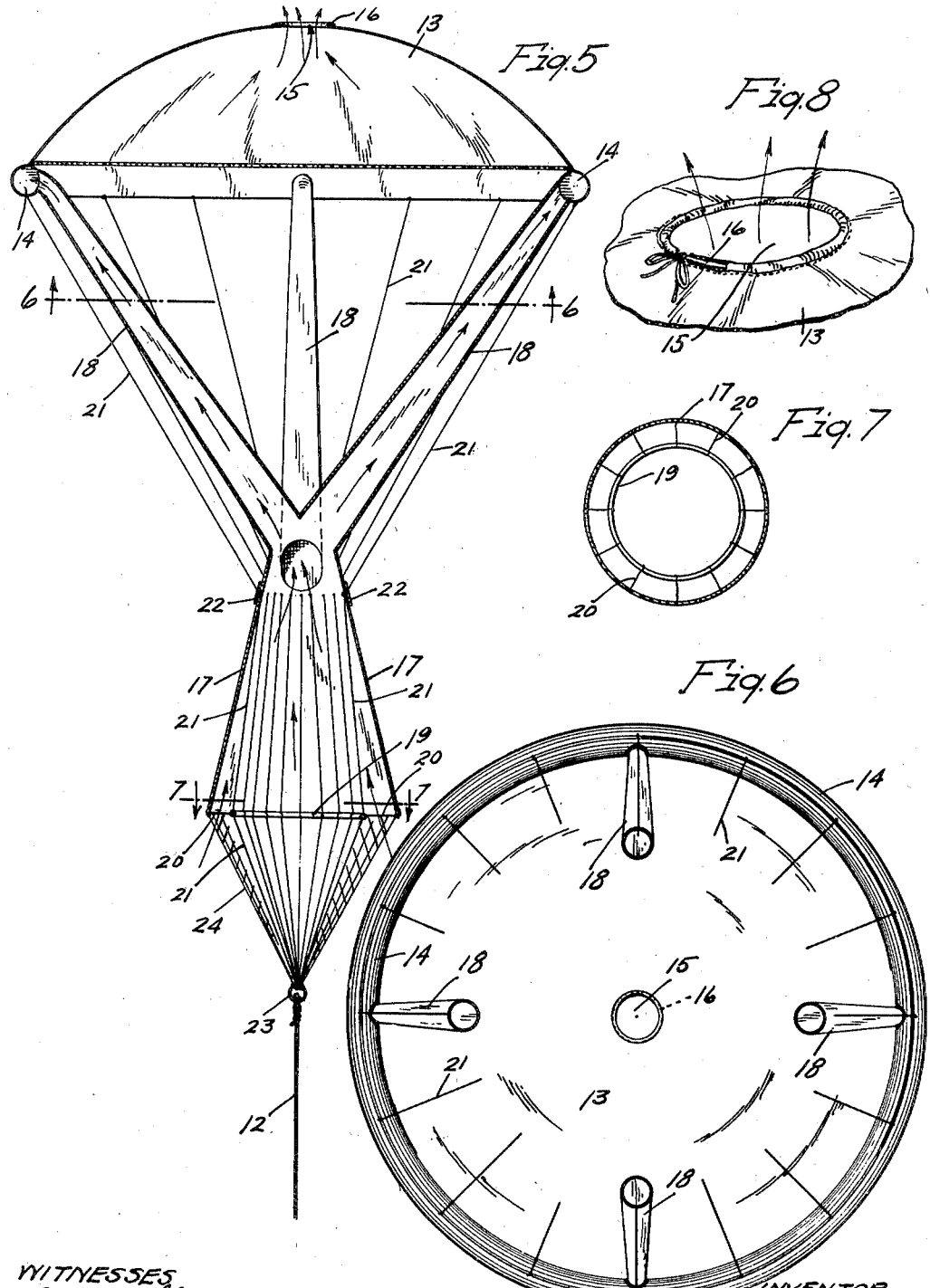

UNITED STATES PATENT OFFICE.

KNUTE S. SATRE, OF HECLA, SOUTH DAKOTA.

PARACHUTE.

1,308,375.    Specification of Letters Patent.    Patented July 1, 1919.

Application filed January 2, 1918. Serial No. 209,816.

*To all whom it may concern:*

Be it known that I, KNUTE S. SATRE, a citizen of the United States, residing at Hecla, in the county of Brown and State of South Dakota, have invented certain new and useful Improvements in Parachutes; and I do hereby declare the following to be a full, clear, and exact description of the invention, such as will enable others skilled in the art to which it appertains to make and use the same.

My invention has for its object to provide an improved parachute adapted for use in connection with aeroplanes, balloons, and flying machines generally; and to such ends, generally stated, the invention consists of the novel devices and combinations of devices hereinafter described and defined in the claims.

It is a well known fact that the efficiency of a parachute after once opened up can be accurately determined and that the great danger in the use of a parachute is that it may not always be relied upon to open up, or in other words, to start the opening action.

My invention is directed primarily to means whereby, without the use of springs, or the like, the opening of the parachute is insured. This feature of the invention involves the use of a so-called charging head, preferably an inverted funnel-shape and flexible air tubes that extend therefrom to the parachute proper. In the preferred arrangement, the parachute proper is provided with a flexible marginal tube and the air charging tubes that extend from the charging funnel diverge upward and rearwardly in respect to the axis of the parachute and deliver the air to the marginal tube. In this preferred arrangement, the flexible marginal tube of the parachute constitutes what may be broadly treated as an inflatable expanding element which may take various forms, but which will receive a charge of air from the so-called charging head of the funnel.

Under downward travel of the parachute, before it is opened up, the initial charge of air is insured through the charging funnel which, by a suitable spacing ring or device, is held always open at least to a very considerable extent. The air caught in this funnel or charging head is delivered to the so-called charging tubes into the marginal tube of the parachute and the said tube will thus be inflated, and when inflated, will be given an annular form which insures the opening of the parachute proper, or in other words, the main hood of the parachute.

The improved parachute in its preferred form, is illustrated in the accompanying drawings wherein like characters indicate like parts throughout the several views.

Referring to the drawings,

Fig. 3 shows a parachute rolled up;

Fig. 4 shows the parachute partly unfolded;

Fig. 5 is a vertical axial section taken through the parachute and showing the same completely opened up;

Fig. 6 is a section on the line 6—6 of Fig. 5;

Fig. 7 is a section on the line 7—7 of Fig. 5; and

Fig. 8 is a plan view showing the central portion only of the main hood of the parachute.

Figure 1:
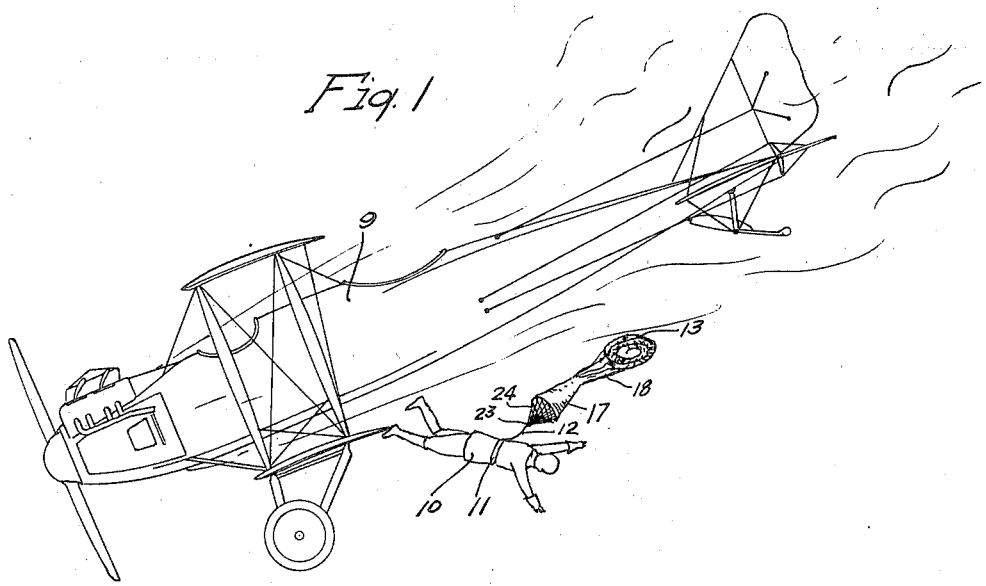
Figure 1 is a perspective view showing an aeroplane and showing a man with an attached parachute jumping from the aeroplane.
Figure 2:
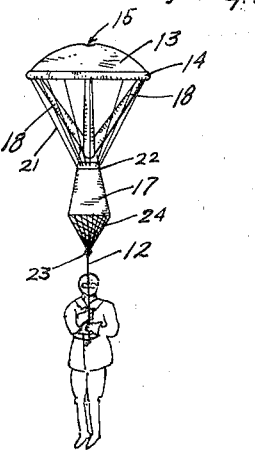
Fig. 2 shows the parachute opened up and a man suspended therefrom making a descent.

The aeroplane shown in Fig. 1 is indicated, as an entirety, by the numeral 9. In Figs. 1 and 2, the numeral 10 indicates a man attached to a parachute by a belt 11 and suspending cable 12.

Of the parts of the parachute, the numeral 13 indicates the main hood, which, at its margin, is provided with a pliable tube 14 preferably, but not necessarily, of the same material as the main hood. The main hood is shown as provided with a central opening 15, the size of which may be varied by an adjusting cord 16 connected in the hemmed edge thereof. This opening 15, while not absolutely necessary, is desirable because it increases the stability of the parachute and decreases its tendency to sway in making its descent.

The so-called charging head 17, which is preferably funnel-shaped, is also a flexible structure, and, as stated, is preferably of inverted funnel shape. At its lower end, it is open and at its upper end, it is merged into a plurality of charging tubes 18 that diverge radially and upwardly therefrom and are attached to and deliver into the collapsible marginal tube 14 at various different points. Located in the mouth or open lower end of the charging funnel 17 is a so-called spreader ring 19 that is preferably of less diameter than the completely expanded surrounding mouth of the said funnel and is attached thereto by short radial cords or flexible cables 20. Guy ropes or cables 21 are attached at their upper ends to the tube 14 or other rim portion of the main hood 13 of the aeroplane. These guy ropes are brought downward and passed through perforations in a flexible reinforcing band 22 that is attached to the upper portion of the said funnel. Preferably the cables 21 are also anchored to the reinforcing band 22, and from thence, they are brought downward and attached to the ring 19. Here it may be stated that the ring 19 is preferably of metal but may be made of any other suitable stiff material which will always insure the lower end of the funnel 17 being held open to a very considerable extent, so that it will be sure to receive the initial charge of air. From the ring 19, the cables 21 are brought downward and secured to a ring 23 to which ring the upper end of the suspending cable 12, before noted, is securely attached. A light flexible network 24 of conical form is attached at its expanded upper portion to the open lower edge of the funnel 17 and at its apex is attached to the ring 23.

The flexible parts 13, 14, 17 and 18 of the parachute may be made of any suitable light flexible material, but would preferably be made of some very light and strong fabric oiled, or otherwise treated to make the same nearly or quite impervious to the passage of air, as well as strong and durable. Fig. 3 shows the parachute rolled up or folded. Preferably, it is coiled, as shown in Fig. 3, but might be otherwise folded together. When it is to be used, it will be attached to the person, as already described, and as shown in Figs. 1 and 2. The user with the parachute attached and folded or rolled up, can jump out into space clear of the aeroplane or balloon and under his initial descent, the air instantly caught in the funnel or charging hood 17, will be forced through the tubes 18 into the marginal tube 14, thereby inflating the latter and causing the hood 13 to be spread so that it will catch air. As soon as the hood 13 catches its forced charge of air, its opening will thereby be hastened so that all of the inflatable parts of the parachute, including the hood, will be quickly opened up and brought into action. Thus it will be seen that the charging head being always open for a charge of air under descent, will positively insure a quick opening of the parachute.

The efficiency of this parachute has been demonstrated in actual practice. In practice, it has been found that not only will the parachute open quickly, but that in descending, it will not be subjected to much vibration. Of course, the opened so-called charging funnel 17, in itself will catch a large amount of air and hence, will act as a sort of an auxiliary parachute which will assist the hood 13 in sustaining the load.

As before stated, the opening 15 in the top of the hood is desirable to increase the stability of the parachute. When it is employed, however, it is important that it be of much less diameter than the diameter of the charging head or funnel, so that the latter will much more than compensate for the sustaining surface removed from the hood by its axial opening. The described arrangement of the guy ropes or cables 21 distributes the strain evenly and at numerous different points throughout the flexible structure of the parachute; and by bringing the lower portions of the cables into the charging funnel, they are prevented from being intertangled when the parachute is collapsed and rolled up or folded.

What I claim is:

1. A parachute comprising a main hood, having a flexible inflatable expander, a charging head located below said hood and connected to said expander for inflating the same, and a non-collapsible spreader ring secured within the open lower end of said charging head for normally holding the same open.

2. A parachute comprising a main hood, having a flexible inflatable expander, a charging head located below said hood and connected to said expander for inflating the same, a spreader ring secured within the open lower end of said charging head for normally holding the same open, guy cables attached to the marginal portion of said hood and extended into said charging head and attached to said spreader ring, and a supporting cable having its upper end anchored to said spreader ring.

3. A parachute comprising a main hood having a flexible inflatable expander, a charging head located below said hood and connected to said expander for inflating the same, a spreader ring secured within the open lower end of said charging head for normally holding the same open, guy cables attached to the marginal portion of said hood and extended into said charging head and attached to said spreader ring, a supporting cable having its upper end anchored to said spreader ring, short flexible cables connecting said spreader ring to the lower end portion of said charging head, and flexible connections between said supporting cable and the upper lower end portion of said charging head.

4. A parachute comprising a main hood having a flexible inflatable marginal tube, a charging funnel located below said hood, arms connecting the upper end of said charging funnel to said marginal tube, a spreader ring secured in the lower end of said charging funnel and normally holding the same open, a suspending cable, and guy cables attached at their upper ends to the marginal portion of said hood extended into said charging funnel, attached to said spreader ring and from thence, extended downward and attached to the upper end of said suspending cable.

5. A parachute comprising a main hood having a flexible inflatable marginal tube, a charging funnel located below said hood, arms connecting the upper end of said charging hood to said marginal tube, a spreader ring secured in the lower end of said charging funnel and normally holding the same open, a suspending cable, and guy cables attached at their upper ends to the marginal portion of said hood extended into said charging funnel attached to said spreader ring and from thence, extended downward and attached to the upper end of said suspending cable, the said hood having an axial air passage of less diameter than said charging funnel.

6. A parachute comprising a main hood having a flexible marginal tube, a flexible funnel located below said hood, charging tubes connecting the upper portion of said flexible funnel to said marginal tube for inflating the same, a spreader ring within the lower portion of said flexible funnel, short flexible cables connecting said spreader ring to the lower end portion of said flexible funnel, guy cables attached at their upper ends to the marginal portion of said hood, said cables being extended downward into said flexible funnel, therein anchored to said spreader ring and from thence, downward and gathered together, a ring to which the gathered lower ends of said cables are attached, and a suspending cable attached to and depending from said ring.

In testimony whereof I affix my signature in presence of two witnesses.

KNUTE S. SATRE.

Witnesses:
HARRY D. KILGORE,
F. D. MERCHANT.